(12) United States Patent
Tanaka (10) Patent No.: US 10,901,308 B2
(45) Date of Patent: Jan. 26, 2021

(54) PROJECTION DISPLAY APPARATUS (71) Applicant: CANON KABUSHIKI KAISHA, Tokyo (JP)

(72) Inventor: Junichi Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/751,309

(22) Filed: Jan. 24, 2020

(65) Prior Publication Data

US 2020/0241398 A1 Jul. 30, 2020

(30) Foreign Application Priority Data

Jan. 29, 2019 (JP) .................................. 2019-013034

(51) Int. Cl.
*G03B 21/14* (2006.01)
*H04N 9/31* (2006.01)
*G03B 21/20* (2006.01)
*G03B 21/53* (2006.01)

(52) U.S. Cl.
CPC ....... *G03B 21/142* (2013.01); *G03B 21/2046* (2013.01); *G03B 21/53* (2013.01); *H04N 9/3185* (2013.01)

(58) Field of Classification Search
CPC ...... G03B 21/142; G03B 21/14; G03B 21/53; H04N 9/3185
See application file for complete search history.

(56) References Cited

U.S. PATENT DOCUMENTS

| 6,592,228 B1 * | 7/2003 | Kawashima | ........... G03B 21/11 348/745 |
| 10,437,027 B2 | 10/2019 | Nagatoshi | |
| 2006/0187184 A1 * | 8/2006 | Miyasaka | ............ H04N 9/3185 345/104 |
| 2019/0361208 A1 | 11/2019 | Mori | |

FOREIGN PATENT DOCUMENTS

| JP | 2017211478 A | 11/2017 |
| JP | 2017215419 A | 12/2017 |

* cited by examiner

*Primary Examiner* — Ryan D Howard
(74) *Attorney, Agent, or Firm* — Rossi, Kimms & McDowell LLP (57) ABSTRACT

A projection display apparatus includes a controller provided inside a projection optical system that projects an image on a projection surface and configured to control driving of a focus unit that provides focusing of a projection image on the projection surface, a shifter configured to move the projection optical system on a plane orthogonal to an optical axis of the projection optical system, and an acquirer configured to acquire positional information of the shift unit. The controller sets a driving condition of the focus unit using positional information of the shift unit and a relationship between an image height and a depth of field of the projection optical system.

9 Claims, 7 Drawing Sheets

PROJECTION DISPLAY APPARATUS

BACKGROUND OF THE INVENTION

Field of the Invention

The present invention relates to a projection display apparatus.

Description of the Related Art

A recently proposed projection display apparatus includes a reimaging projection optical system for a high degree of freedom in installation, a super wide angle, and a wide lens shift range (Japanese Patent Laid-Open Nos. ("JPs") 2017-215419 and 2017-211478).

In a projection optical system with a super wide angle and a wide lens shift range, as represented by a reimaging projection optical system, a light beam diameter parallel to the screen in the defocus in the peripheral part is larger than that in the optical axis center part. As a result, the difference between the depth of field at the optical axis center part and the depth of field at the peripheral part is larger than that of a general projection optical system. That is, in the projection display apparatus equipped with a reimaging projection optical system, the depth of field at the peripheral part of the projection image when the lens shift amount is the maximum value is shallower than the depth of field at the center part of the projection image when the lens shift amount in a plane orthogonal to the optical axis of the lens is zero.

The projection optical system in the general projection display apparatus has a focusing function. For example, the user viewing the projection surface presses the focusing button as many times as necessary for focusing of the projection image. However, in the lens shift or in emphasizing the peripheral part in the projection image, if a moving amount of the focus lens is set as if it is for an adjustment of the optical axis center, the adjustment becomes difficult due to the difference in depth. More specifically, the adjustment becomes difficult because the moving amount does not change even though the depth of field becomes shallower. JPs 2017-215419 and 2017-211478 are silent about this problem.

SUMMARY OF THE INVENTION

The present invention provides a projection display apparatus that can properly provide focusing using a projection optical system in which a depth of field varies depending on an image height.

A projection display apparatus according to one aspect of the present invention includes a driver provided inside a projection optical system that projects an image on a projection surface and configured to drive a focus unit that provides focusing of a projection image on the projection surface, a shifter configured to move the projection optical system on a plane orthogonal to an optical axis of the projection optical system, and an acquirer configured to acquire positional information of the shift unit. The driver sets a driving condition of the focus unit using positional information of the shift unit and a relationship between an image height and a depth of field of the projection optical system.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

First Embodiment

Figure 1:
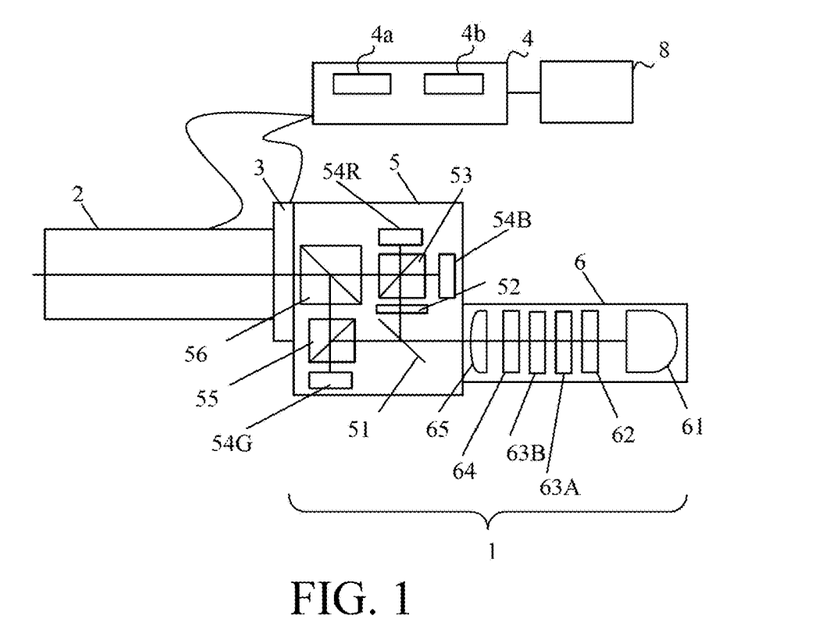
FIG. 1 schematically illustrates a configuration of a projection display apparatus according to one embodiment of the present invention.

FIG. 1 is a schematic diagram illustrating a configuration of a projection display apparatus 1 according to an embodiment of the present invention. A lens unit (projection optical system) 2 is detachably attached to the projection display apparatus 1. The lens unit 2 may be fixed onto the projection display apparatus 1.

An illumination optical system 6 uniformly guides light from a light source 61 to a predetermined area. A UV-cut filter 62 cuts light in a predetermined short wavelength domain from the light from the light source 61. Fly-eye lenses 63A and 63B make uniform the light from the UV-cut filter 62. A PS conversion element 64 adjusts a polarization direction of the light from the fly-eye lens 63B. A condenser lens 65 condenses the light from the PS conversion element 64 onto a predetermined area.

A color separating/combining optical system 5 separates the light from the illumination optical system 6 into three colors of red, green, and blue, generates an arbitrary image for each color, then combines the light beams together and guides it to the lens unit 2. A dichroic mirror 51 transmits the green light out of the light from the condenser lens 65 and reflects the red light and the blue light. A color select 52 changes a polarization direction of the red light out of the light from the dichroic mirror 51. Of the light from the color select 52, a red/blue polarization beam splitter 53 reflects the blue light and transmits the red light. A green polarization beam splitter 55 reflects the green light from the dichroic mirror 51. Each of a blue liquid crystal display element 54B, a red liquid crystal display element 54R, and a green liquid crystal display element 54G generates an arbitrary image. A color selective optical element 56 reflects the green light and transmits the red light or the blue light. The light from the color selective optical element 56 is guided to the lens unit 2.

Figure 2:
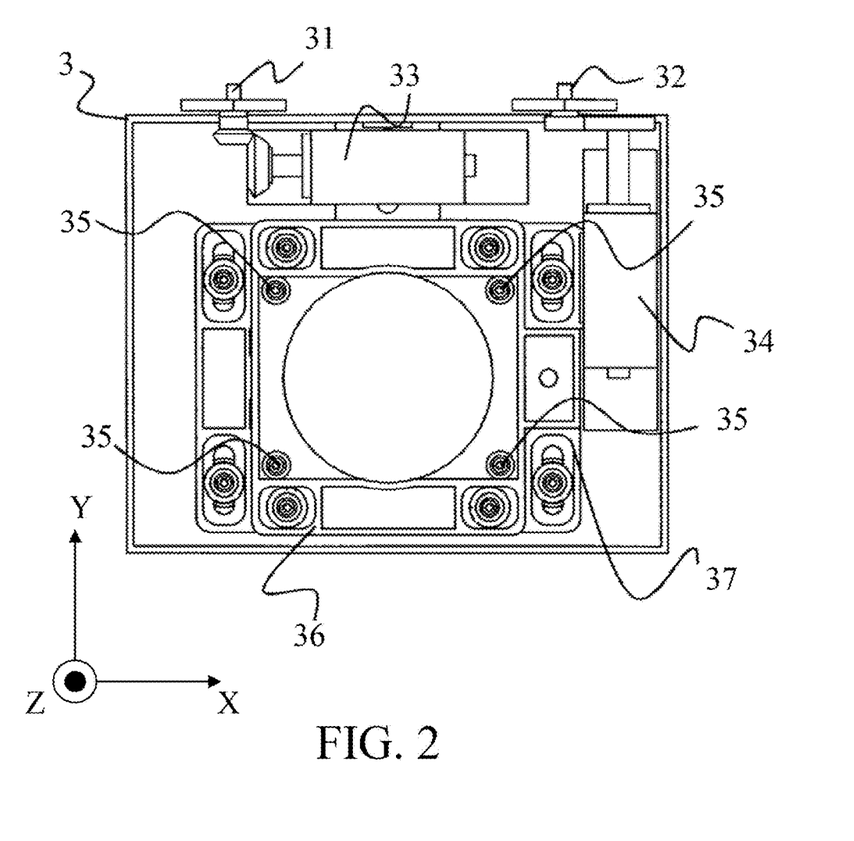
FIG. 2 illustrates a shift unit viewed from a screen side.

FIG. 2 illustrates a shift unit (shifter) 3 viewed from the screen (projection surface) side. Assume that Z axis is the optical axis of the lens unit 2. Then, the shift unit 3 holds the lens unit 2 movably on a plane (XY plane) orthogonal to the Z axis. An X-direction operation lever 31 moves the lens unit 2 in the X direction. A Y-direction operation lever 32 moves the lens unit 2 in the Y direction. An X-direction moving plate 36 screws the lens unit 2 onto a lens fastener 35 and holds it movably in the X direction. A Y-direction moving plate 37 holds the X-direction moving plate 36 holding the lens unit 2 movably in the Y direction. An X-direction shift sensor 33 transmits a driving force to the X-direction moving plate 36 and detects the position of the X-direction moving plate 36. A Y-direction shift sensor 34 transmits a driving force to the Y-direction moving plate 37 and detects the position of the Y-direction moving plate 37. The X-direction shift sensor 33 and the Y-direction shift sensor 34 are electrically connected to a control board (controller) 4.

Figure 3A:
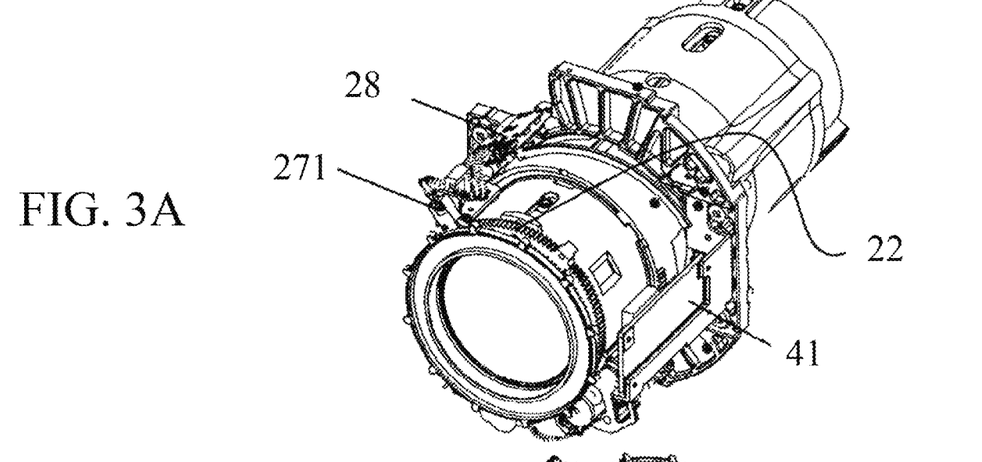
FIGS. 3A to 3C are perspective views of the lens unit.
Figure 3B:
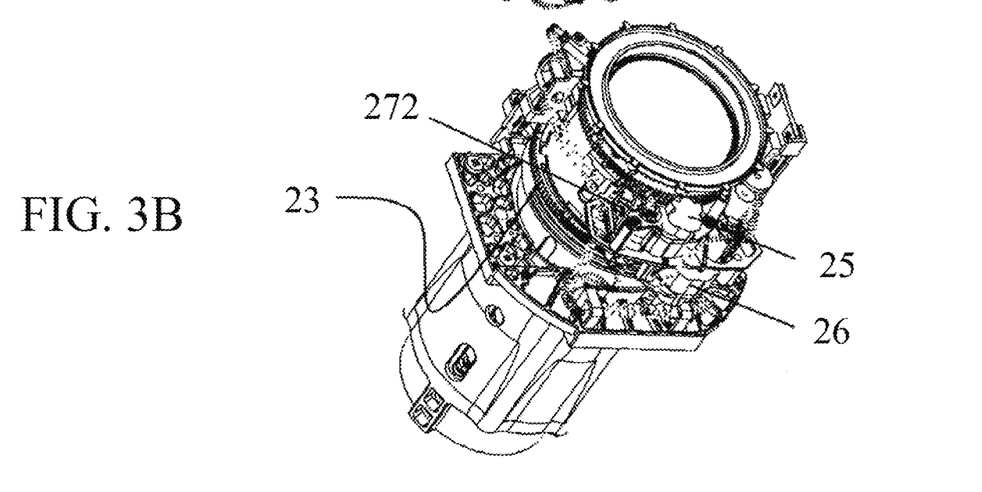
Figure 3C:
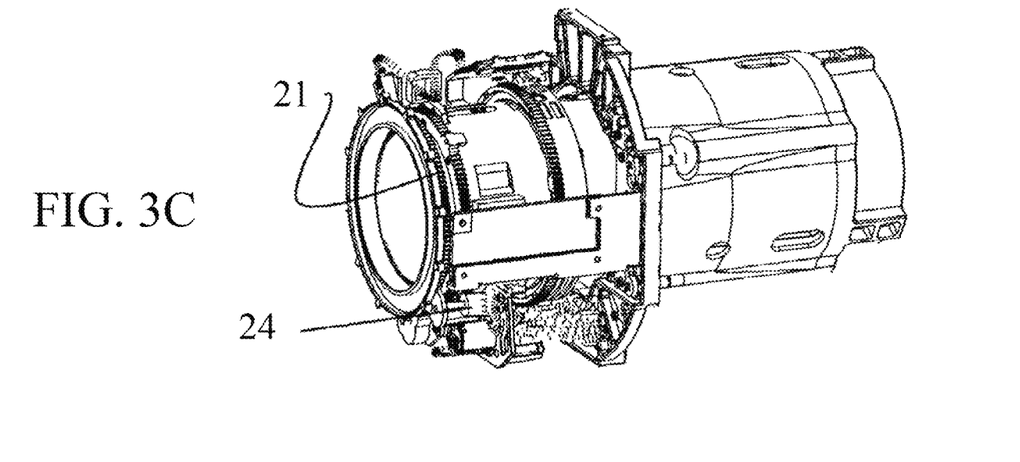
Figure 4:
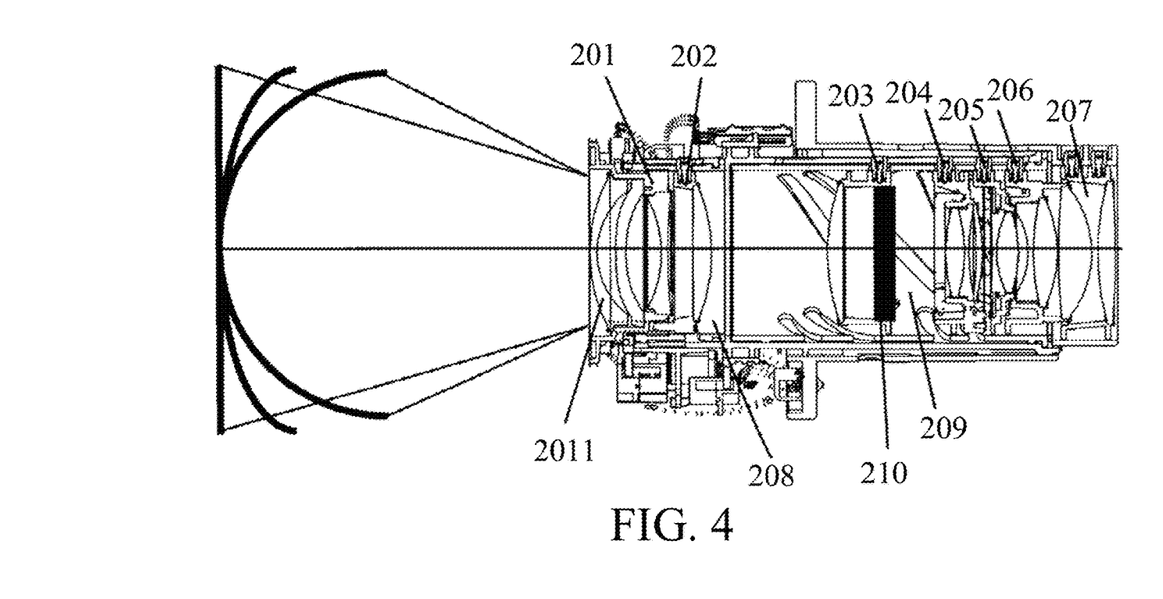
FIG. 4 is a sectional view of a lens unit.

FIGS. 3A to 3C are perspective views of the lens unit 2. FIG. 4 is a sectional view of the lens unit 2. The lens unit 2 has a focus unit that provides focusing of the projection image on the screen. In this embodiment, the focus unit includes a field curvature adjustment unit (field curvature adjuster) 201 and a focus lens 202.

The field curvature adjustment unit 201 includes at least one lens and is held by a helicoid screw. A front lens 2011 is disposed on a side closest to the screen in the field curvature adjustment unit 201. The field curvature adjustment unit 201 is moved along the optical axis by receiving the driving force from a motor 24 via a field curvature gear 21. The motor 24 incorporates a sensor that detects the position of the field curvature adjustment unit 201 in the optical axis direction. The field curvature adjustment unit 201 moves along the optical axis for focusing of the projection image on the screen in a nonplanar manner as illustrated in FIG. 4. The curvature degree is variable by the moving amount of the field curvature adjustment unit 201.

The focus lens 202 includes at least one lens. The focus lens 202 moves along the optical axis by rotating a focus cam 208 via a focus gear 22 by the driving force from the motor 25. An end detection switch 271 and a photo-interrupter 272 detect the position of the focus lens 202 in the optical axis direction.

Zooming units 203 to 206 move along the optical axis by rotating a zoom cam 209 via a zoom gear 23 by the driving force from a zooming motor 26. A magnification varying sensor 28 is a slide type position sensor, and detects the positions of the zooming units 203 to 206 in the optical axis direction.

Figure 5A:
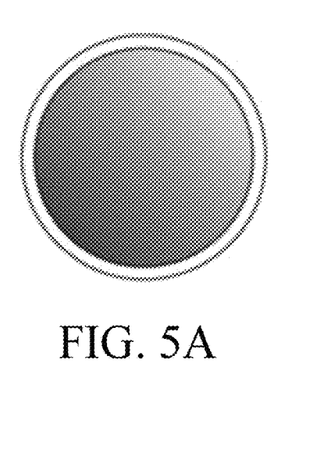
FIGS. 5A to 5C illustrate the aperture degree of a lens diaphragm.
Figure 5B:
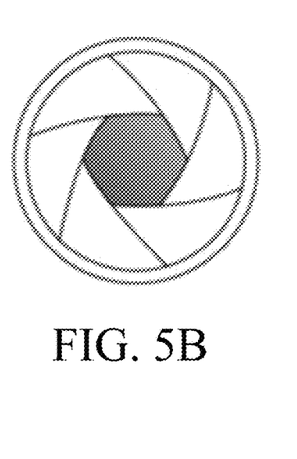
Figure 5C:
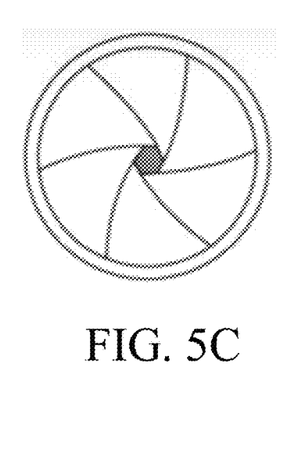

A lens diaphragm (light amount adjuster) 210 adjusts a light amount that transmits through the lens unit 2 (transmitted light amount) by moving diaphragm blades and by changing the aperture degree as illustrated in FIGS. 5A-5C. A fixed unit 207 is held so as not to move in the lens unit 2.

A lens substrate 41 acquires information from the sensor in the lens unit 2 and transmits a drive signal to the motor in the lens unit 2. The lens substrate 41 is electrically connected to the control board 4.

The control board 4 includes an acquirer 4a that acquires information from detectors provided in the lens unit 2 and the shift unit 3. The control board 4 performs a predetermined calculation using the information acquired by the acquirer 4a and generates the drive signal of the lens unit 2. That is, the control board 4 serves as a controller that controls driving of the lens unit 2. More specifically, the control board 4 drives the lens inside the lens unit 2 or moves the lens unit 2 via the shift unit 3 on a plane orthogonal to the optical axis of the lens unit 2.

The control board 4 further includes a memory 4b that stores information. In this embodiment, the memory 4b stores, for each lens unit 2, a relationship between the image height and the depth of field of the lens unit 2. The control board 4 may calculate, for each lens unit 2, the relationship between the image height and the depth of field of the lens unit 2 instead of including the memory 4b, and acquire it from an external device (such as the lens unit 2 and a server) that stores the relationship. The memory 4b may store a relationship between the aperture degree of the lens aperture 210 and the depth of field.

The control board 4 is connected to an operation unit 8. The operation unit 8 serves as an input unit (or setter) that accepts a variety of inputs from the user, such as a setting, a control command, and a driving condition. The operation unit 8 includes a display unit configured to display various information, such as a current status, a message, an image, and control information. The operation unit 8 includes a keyboard, a lever, a button, a touch panel, and a LCD, etc.

Figure 6:
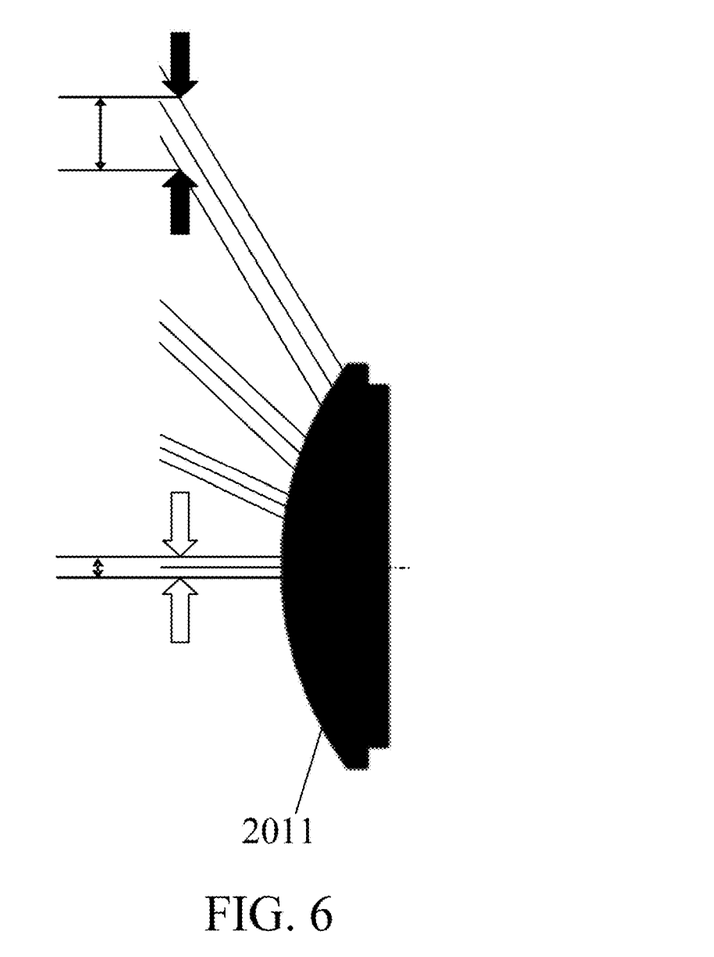
FIG. 6 illustrates a light beam parallel to the screen in a defocus.

FIG. 6 illustrates a light beam parallel to the screen in the defocus. In the projection optical system with a super wide angle and a wide lens shift range, a light beam parallel to the peripheral part on the screen has a wider diameter as indicated by black arrows than that of the light beam parallel to the optical axis center part as indicated by white arrows. As a result, the difference between the depth of field at the optical axis center part and the depth of field at the peripheral part is larger than that of the general projection optical system.

Herein, in the super wide angle lens unit 2 to which the present invention is applied, the ratio (projection ratio) of the distance x from the screen to the lens unit 2 to a lateral length y of the screen satisfies the following conditional expression (1).

$$x/y < 1.0 \tag{1}$$

In the lens unit 2 in which the projection ratio does not satisfy the conditional expression (1), the depth of field does not change or hardly changes according to the image height, so that the driving condition of the focus unit needs not be changed according to the image height as described later. Although the driving condition of the focus unit may be changed, the adjustment takes a time longer than usual.

The projection ratio may satisfy the following conditional expression (2).

$$x/y < 0.8 \tag{2}$$

This embodiment can perform focusing by driving the focus lens 202, and adjust the field curvature by driving the field curvature adjuster 201. For example, in focusing, if a focusing button (not shown) is pressed once, the focal plane moves by a unit amount. If the unit amount is too small, the adjustment takes a long time. If the unit amount is too large, the focal plane cannot be moved to the best position. Similarly, in the field curvature adjustment, if the change amount in the focal plane is too small when a field curvature adjustment button (not shown) is pressed once, the adjustment takes a long time. If the change amount is too large, the focal plane cannot be moved to the best position.

Figure 7A:
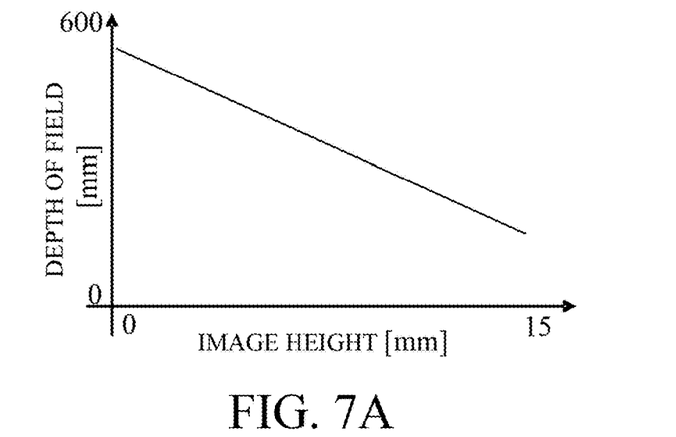
FIG. 7A illustrates an illustrative relationship between an image height and a depth of field of a lens unit.

As described above, in the lens unit 2 according to this embodiment, the depth of field changes according to the image height. FIG. 7A illustrates an illustrative relationship between the image height and the depth of field of the lens unit 2. The abscissa axis represents the image height, and the ordinate axis represents the depth of field. The depth of field is the deepest when the image height is 0 mm, and the depth of field decreases as the image height increases.

Figure 7B:
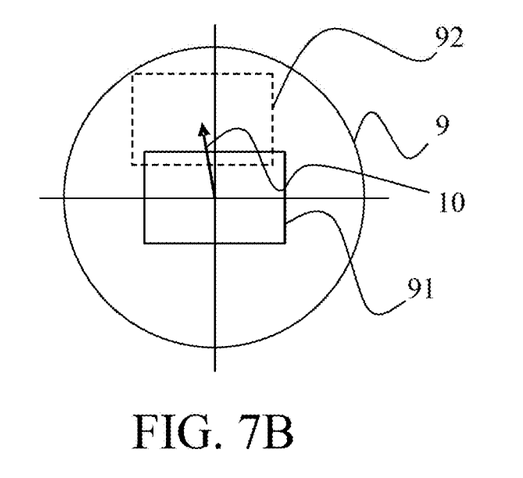
FIG. 7B schematically illustrates a movement of a projection area and an image height within an effective image circle including a lens shift.

FIG. 7B is a schematic diagram illustrating the movement of the projection area and the image height within an effective image circle 9 including the lens shift. Ae projection area 91 is an area when the lens is not shifted, and the image height at the center of the screen is zero. A projection area 92 is an area when the lens is shifted, and the image height at the center of the screen is an image height 10 indicated by an arrow. When compared at the center of the screen, the projection area 92 has an image height higher than the projection area 91, and the depth of field in the projection area 92 is shallower than that of the projection area 91.

In this embodiment, since the depth of field changes depending on the image height, the adjustment amount of the focal plane is set according to the depth of field. More specifically, the control board 4 sets the driving condition of the focus unit corresponding to the adjustment amount using the relationship between the shift position of the lens unit 2 and the relationship between the depth of field and the image height of the lens unit 2.

Figure 7C:
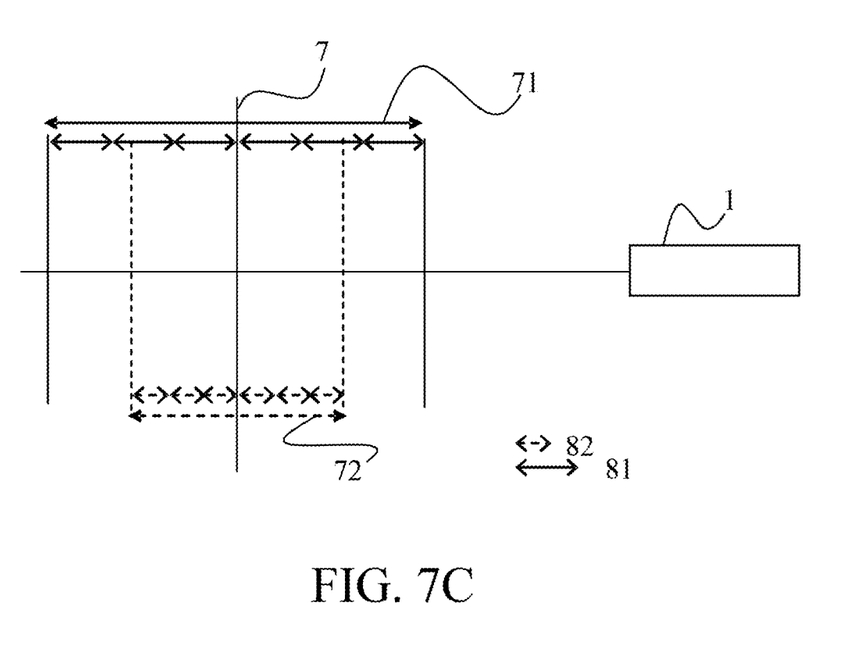
FIG. 7C illustrates an adjustment amount for each depth of field.

FIG. 7C illustrates an illustrative adjustment amount for each depth of field. When the depth of field is a depth of field 71 in the projection area 91, the control board 4 sets the driving condition of the focus lens 202 corresponding to an adjustment amount 81 obtained by dividing the depth of field 71 into six parts around the best focal plane 7 of the projection image. When the depth of field is a depth of field 72 in the projection area 92, the control board 4 set the driving condition of the focus lens 202 corresponding to an adjustment amount 82 obtained by dividing the depth of field 72 into six parts around the best focus plane 7.

This embodiment has described the driving condition of the focus lens 202 changed as the driving condition of the focus unit, but may set the driving condition of the field curvature adjustment 201.

Figure 8:
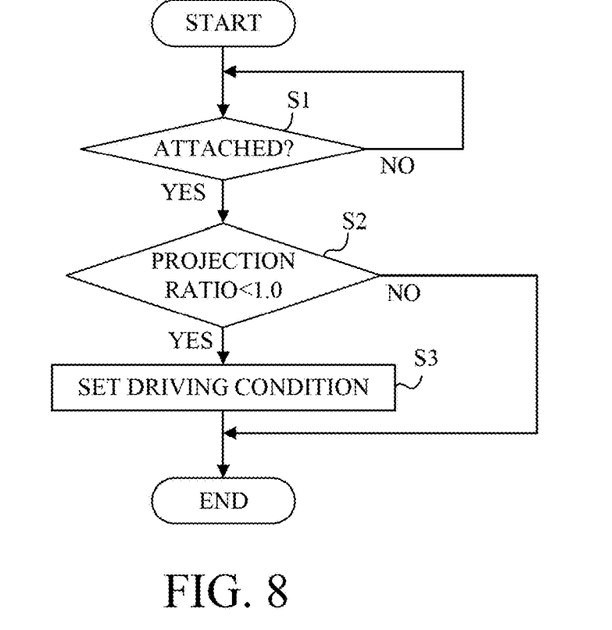
FIG. 8 is a flowchart illustrating setting processing of a driving condition of a focus unit.

Referring now to FIG. 8, a description will be given of setting processing of the driving condition of the focus unit according to the present invention executed by the control board 4. FIG. 8 is a flowchart illustrating the setting processing of the driving condition of the focus unit of the present invention.

In the step S1, the control board 4 determines whether or not the lens unit 2 is attached to the projection display apparatus 1. When the lens unit 2 is attached to the projection display apparatus 1, the flow proceeds to the step S2. When the lens unit 2 is not attached to the projection display apparatus 1, this step is repeated. When the lens unit 2 is fixed onto the projection display apparatus 1, this step need not be executed.

In the step S2, the control board 4 determines whether or not the projection ratio of the lens unit 2 is less than 1.0. When the projection ratio is less than 1.0, the process proceeds to step S3, and when the projection ratio is 1.0 or higher, this flow ends. This step determines whether or not the lens unit 2 has a wide angle using the projection ratio, but the present invention is not limited to this embodiment as long as it can be determined whether or not the lens unit 2 has a wide angle. For example, the control board 4 may acquire identification information that identifies the lens unit 2 and may determine whether the lens unit 2 has a wide angle using the acquired identification information.

In the step S3, the control board 4 first acquires the image height in the projection area using the position of the projection area (position of the shift unit 3). The position of the shift unit 3 can be obtained from information from the X-direction shift sensor 33 and the Y-direction shift sensor 34. Next, the control board 4 sets the driving condition of the focus unit using the shift position of the lens unit 2 and the relationship between the image height and the depth of field of the lens unit 2.

The configuration according to this embodiment can provide the projection display apparatus 1 that can properly provide focusing using the lens unit 2 having the depth of field that varies depending on the image height.

Second Embodiment

The area where the optical performance is to be most highly secured on the projection surface or the area to be preferentially focused is often the center area of the projection surface. Hence, in the initial setting, the driving condition of the focus unit is often set to the central area of the projection surface. However, an area other than the central area on the projection surface may be the area for which the optical performance is to be most highly secured. This embodiment will discuss a properly focusing example using the lens unit 2 having a different depth of field depending on the image height even in such a case.

Figure 9:
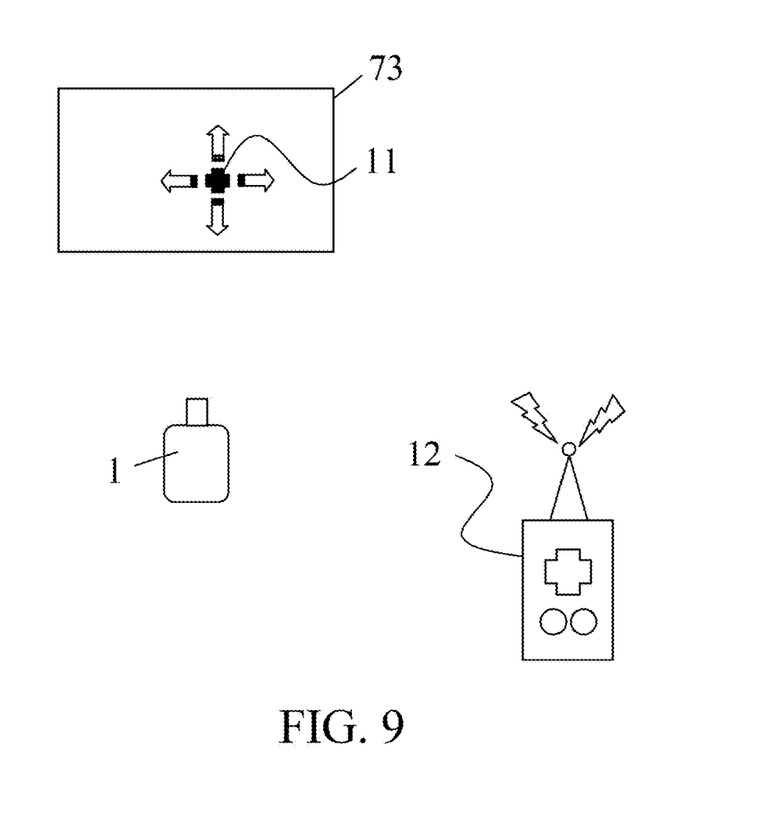
FIG. 9 illustrates a method for designating a position on a projection surface.

Referring now to FIG. 9, a description will be given of a method for designating an area for which the optical performance is to be most highly secured on the projection surface. FIG. 9 illustrates the method for designating (setting) a predetermined position (an area to be preferentially focused) on a projection surface 73. In this embodiment, the projection surface 73 displays a designator 11 for designating a position. A controller 12 can be operated to move the designator 11 within the projection surface 73 and to designate a predetermined position on the projection surface 73 using the designator 11 (or set information on the area to be preferentially focused). While this embodiment has described the method of specifying the predetermined position using the controller 12, the present invention is not limited to this embodiment. When the projection display apparatus 1 has an image sensor or an infrared detection function, a predetermined position may be specified using the image sensor or infrared ray.

Figure 10A:
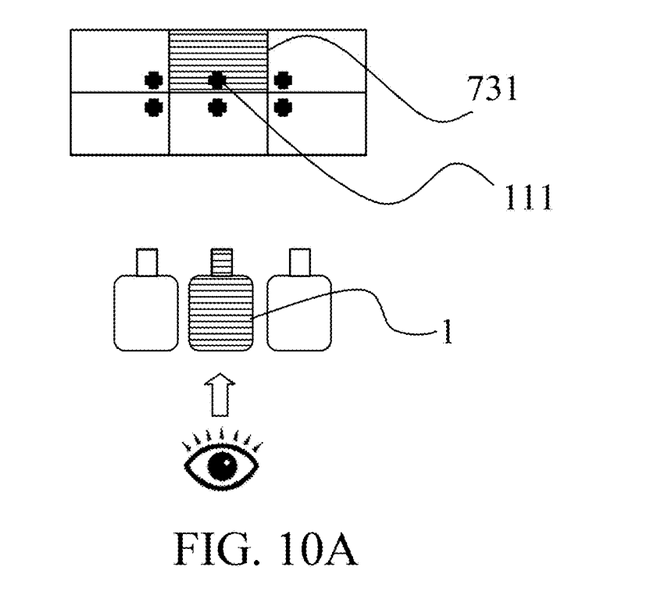
FIGS. 10A and 10B illustrate an example when an area in which the optical performance is to be most highly secured on a projection surface is different from a central area on the projection surface.
Figure 10B:
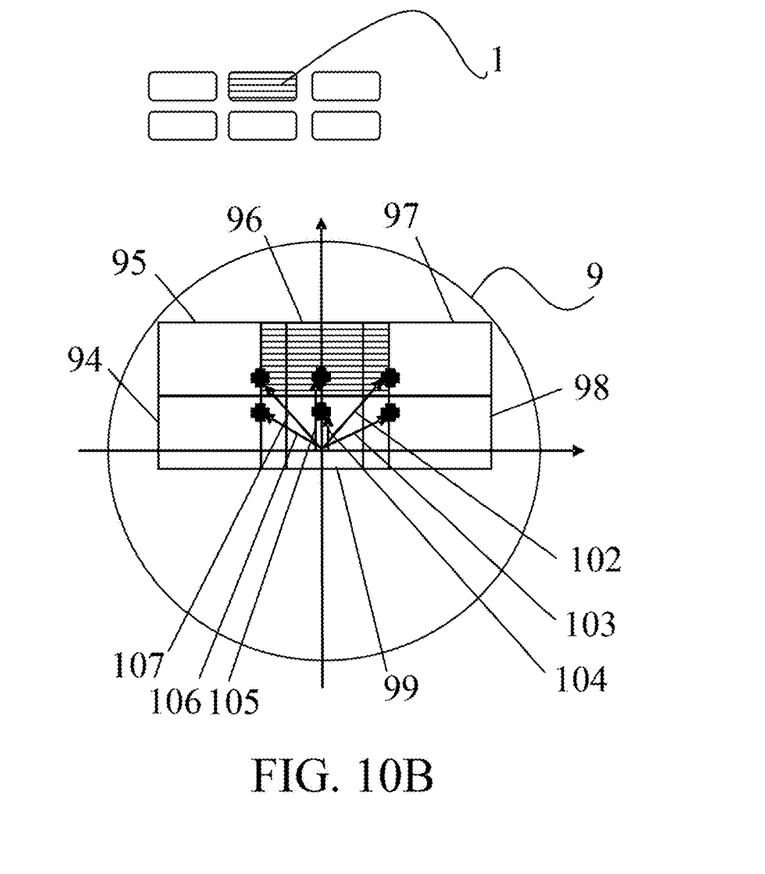

FIGS. 10A and 10B illustrate an illustrative case in which an area for which the optical performance is to be most highly secured on the projection surface is different from the central area of the projection surface. FIG. 10A illustrates six projection display apparatuses 1 are arranged to project a single image or a so-called multi-stack projection. FIG. 10B illustrates the six projection display apparatuses 1 in FIG. 10A viewed from the direction of the arrow in FIG. 9. FIG. 10B is a schematic diagram illustrating projection areas 94 to 99 in the effective image circle 9 including the lens shift and the image heights 102 to 107 of the designation areas of the projection areas.

A designation area 111 is an area for which the optical performance is to be most highly secured on a projection surface 731 on which an image from the hatched projection display apparatus 1 is projected. In projecting a single image, the central area of the projection surface is often designated as the area for which the optical performance is to be most highly secured. However, in the multitask projection, an area close to the center of the single image into which six images are combined is emphasized. Therefore, as illustrated in FIG. 10B, an area may be designated which is close to the center of the single image into which six images are combined. However, the area for which the optical performance is to be most highly secured differs depending on an image source to be projected, a projection target, and the like.

The image height of the designation area can be obtained by combining the position information of the shift unit 3 and the information of the designation area on the projection surface. Acquiring the image height, the control board 4 sets the driving condition of the focus unit, similar to the first embodiment.

The configuration according to this embodiment can provide the display apparatus 1 that can properly perform focusing, even when an area for which the optical performance is to be most highly secured is designated on the projection surface, using the lens unit 2 having a depth of field that varies depending on the image height.

Third Embodiment

In the first and second embodiments, the control board 4 sets the driving condition of the focus unit in accordance with the value obtained by dividing the depth of field by a predetermined division number, but this embodiment uses the driving condition of the focus unit set by the user via the operation unit 8 (setter) provided to the display apparatus 1. As described above, the operation unit 8 serves as the input unit through which the user can input the driving condition.

However, it is the control board 4 that substantially sets the driving condition. Since there is a minimum driving amount of the focus unit due to the relationship between the minimum torque required to drive the focus unit and the minimum applicable torque, there is a minimum value that can also be set to the adjustment amount. The control board 4 determines whether the driving condition input through the operation unit 8 is viable and if so, the control board 4 sets the driving condition as it is. If the driving condition is not viable, the control board 4 determines whether the driving condition becomes viable if the current aperture state (F-number or aperture value) is changed based on the relationship between the light amount adjustment position and the depth of field. If so, the control board 4 adjusts the lens diaphragm 210, and displays the message that the F-number has been changed to set the input driving condition, on the display unit in the operation unit 8. Alternatively, the control board 4 may display a message to ask the user if he allows the automatic F-number adjustment, on the display unit in the operation unit 8. On the other hand, when the control board 4 determines that the input driving condition does not become viable even if the current aperture state is changed (or the user does not allow the F-number adjustment), the control board 4 displays an error message that warns the user that the input driving condition is unavailable or that the control board 4 sets another driving condition (which may be closest to the input driving condition).

Referring now to FIG. 7C, a description will be given of a case where the control board 4 cannot set the driving condition of the focus unit set via the setter. For example, assume that the minimum value that can be set to the adjustment amount is an adjustment amount 81, the depth of field corresponding to the image height of the projection area is the depth of field 72, the user sets the driving condition of the focus unit through the setter to a condition corresponding to an adjustment amount 82 obtained by dividing the depth of field 72 into six parts. Since the minimum value of the settable adjustment amount is the adjustment amount 81, the control board 4 cannot set the driving condition of the focus unit to the condition corresponding to the adjustment amount 82.

In this case, in this embodiment, the control board 4 increases the depth of field by changing the aperture degree of the lens diaphragm 210 so as to reduce the transmitted light amount. For example, the depth of field 72 is expanded to the depth of field 71. As a result, the control board 4 can set the driving condition of the focus unit to the driving condition corresponding to the adjustment amount 82 obtained by dividing the depth of field 72 into six parts. In this embodiment, the memory 4b stores the relationship between the aperture position (light amount adjustment position) of the lens diaphragm 210 and the depth of field. Moreover, the control board 4 may acquire the relationship between the aperture position of the lens diaphragm 210 and the depth of field from the lens substrate 41 or the server instead of including the memory 4b.

According to the configuration of this embodiment, the user can set the driving condition of the focus unit, and the depth of field can be expanded when the user sets a driving condition that cannot be set. Thereby, the projection display apparatus 1 can properly provide focusing using the lens unit 2 having a depth of field that varies depending on the image height.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-013034, filed on Jan. 29, 2019, which is hereby incorporated by reference herein in its entirety.

What is claimed is:
1. A projection display apparatus comprising:
a controller provided inside a projection optical system that projects an image on a projection surface and configured to control driving of a focus unit that provides focusing of a projection image on the projection surface;
a shifter configured to move the projection optical system on a plane orthogonal to an optical axis of the projection optical system; and
an acquirer configured to acquire positional information of the shifter,
wherein the controller sets a driving condition of the focus unit using positional information of the shifter and a relationship between an image height and a depth of field of the projection optical system.
2. The projection display apparatus according to claim 1, further comprising a memory configured to store the relationship between the image height and the depth of field of the projection optical system.
3. The projection display apparatus according to claim 1, wherein the acquirer acquires the position information of the focus unit.
4. The projection display apparatus according to claim 1, wherein the focus unit includes a field curvature adjuster configured to provide focusing of the projection image on the projection surface in a nonplanar manner.
5. The projection display apparatus according to claim 1, wherein the controller sets the driving condition of the focus unit based on information on an area to be preferentially focused on the projection surface.

6. The projection display apparatus according to claim 1, further comprising a setter configured on set the driving condition of the focus unit, wherein when the driving condition of the focus unit set by the setter is unavailable, the controller sets the driving condition of the focus unit using the positional information of the shifter, the relationship between the image height and the depth of field of the projection optical system, and a relationship between the depth of field and a light amount adjustment position of a light amount adjuster provided in the projection optical system and configured to adjust a transmitted light amount.

7. The projection display apparatus according to claim 1, wherein the controller determines whether to set the driving condition of the focus unit based on information from the projection optical system.

8. The projection display apparatus according to claim 7, wherein the information from the projection optical system includes identification information of the projection optical system.

9. The projection display apparatus according to claim 7, wherein the information from the projection optical system is a projection ratio of the projection optical system.

\* \* \* \* \*